(12) United States Patent
Hwang et al.

(10) Patent No.: US 7,467,528 B2
(45) Date of Patent: Dec. 23, 2008

(54) METHOD OF FABRICATING DUAL HOLE GLASS FERRULES

(75) Inventors: Soon-Cheol Hwang, Pohang (KR); Sun-Uk Kim, Pohang (KR); Myong-Cheul Chun, Pohang (KR)

(73) Assignees: Research Institute of Industrial Science & Technology, Pohang, KyungsangBuk-do (KR); JCCOM. Co., Ltd., Yangsan, Kyungsannam-do (KR)

( * ) Notice: Subject to any disclaimer, the term of this patent is extended or adjusted under 35 U.S.C. 154(b) by 596 days.

(21) Appl. No.: 10/250,404

(22) PCT Filed: Oct. 18, 2002

(86) PCT No.: PCT/KR02/01954

§ 371 (c)(1),
(2), (4) Date: Jun. 27, 2003

(87) PCT Pub. No.: WO03/040050

PCT Pub. Date: May 15, 2003

(65) Prior Publication Data

US 2004/0050113 A1    Mar. 18, 2004

(30) Foreign Application Priority Data

Oct. 18, 2001  (KR) ............... 10-2001-0064475
Nov. 12, 2001  (KR) ............... 10-2001-0070266

(51) Int. Cl.
*C03B 37/022* (2006.01)
*C03B 23/047* (2006.01)
*C03B 19/12* (2006.01)

(52) U.S. Cl. ............... 65/393; 65/395; 65/435; 65/17.2; 65/108

(58) Field of Classification Search ............... 65/195, 65/393, 17.2, 395, 435, 108
See application file for complete search history.

(56) References Cited

U.S. PATENT DOCUMENTS 4,648,892 A * 3/1987 Kittrell et al. ............... 65/387
4,840,653 A   6/1989 Rabinovich (Continued)

FOREIGN PATENT DOCUMENTS

JP    S59-93305    5/1984

(Continued)

OTHER PUBLICATIONS

Merriam Webster's Collegiate Dictionary (1997) 10th ed. Merriam-Webster, Inc. 1018-1019.*

*Primary Examiner*—John Hoffmann
(74) *Attorney, Agent, or Firm*—Baker Botts LLP

(57) ABSTRACT

The present invention relates to a preform for a glass ferrule and a fabrication method thereof. It is an objective of the present invention to fabricate dual hole ferrules having various distances between two holes by using a single preform. It is another objective of the present invention to fabricate a preform for a dual hole glass ferrule by a simple process. To meet the above and other objectives, the present invention provides a preform for a glass ferrule, comprising two holes which are formed through the preform and exit out both side cross-sections of the preform, wherein the two holes are symmetrical to the center in a diameter direction of the preform and a distance between the two holes changes in a lengthwise direction of the preform.

8 Claims, 6 Drawing Sheets

U.S. PATENT DOCUMENTS

| | | | |
|---|---|---|---|
| 5,183,489 A * | 2/1993 | Brehm et al. | 65/407 |
| 5,240,488 A | 8/1993 | Chandross et al. | |
| 5,279,633 A | 1/1994 | Fleming | |
| 5,295,210 A * | 3/1994 | Nolan et al. | 385/43 |
| 5,665,133 A * | 9/1997 | Orii et al. | 65/17.6 |
| 5,891,210 A * | 4/1999 | Watanabe et al. | 65/406 |
| 5,922,099 A * | 7/1999 | Yoon et al. | 65/395 |
| 6,012,304 A * | 1/2000 | Loxley et al. | 65/111 |
| 6,467,312 B1 * | 10/2002 | De Hazan et al. | 65/395 |

FOREIGN PATENT DOCUMENTS

| | | |
|---|---|---|
| JP | S61-257638 | 11/1986 |
| JP | 62-59547 | 3/1987 |
| JP | 6-67040 | 3/1994 |

* cited by examiner

PRIOR ART

METHOD OF FABRICATING DUAL HOLE GLASS FERRULES

BACKGROUND OF THE INVENTION (a) Field of the Invention

The present invention relates to a preform for a glass ferrule and a fabrication method thereof, and more particularly to a preform for a dual hole ferrule made of glass, a fabrication method of the preform, and a fabrication method of the dual hole glass ferrule using the preform.

(b) Description of the Related Art

An optical ferrule, as an optical component, is used for connecting the cut ends of optical fiber to each other or to several optical devices. Optical fiber is inserted into the hole that is formed in the optical ferrule, and light is guided along the optical fiber.

Optical ferrules are generally classified as ceramic ferrules and glass ferrules. Ceramic ferrules are fabricated individually, while glass ferrules are fabricated by the same method as that of an optical fiber, that is, by using their viscous and flexible properties when heated.

A glass ferrule is fabricated by heating a glass preform, drawing the preform to a desired diameter in a drawing machine, cutting the preform having the desired diameter to a desired length, and processing its two ends and desired portions. The hole in the glass ferrule must be formed in parallel with the central axis extending along the lengthwise direction of the ferrule. Therefore, the hole in the glass preform must also be formed rectilinearly and in parallel with the central axis extending along the length direction of the preform.

In the case of a single-hole ferrule, a single hole having a desired diameter is formed at a center axis of the cylinder-shaped glass preform, and then the preform is elongated by use of a drawing machine while controlling the diameters of the preform and the hole to predetermined values.

However, in the case of dual-hole ferrule, the distance between the two holes, as well as the diameter of the preform and the hole, must be controlled.

FIGS. 1 and 2 are respectively longitudinal and horizontal cross-sectional views of a conventional preform for fabricating a glass ferrule. As shown in these figures, two holes 2 are rectilinearly formed in parallel with the longitudinal central axis (X), while maintaining the same distance from the center In the horizontal cross-sectional circle of the conventional preform 1.

Drawing the preform at an appropriate temperature and at an appropriate speed by a draw tower results in a ferrule in which two holes are formed in parallel with the central axis extending along the lengthwise direction of the preform. The distance between the two holes formed in the ferrule can be estimated from the original distance between the two holes formed in the preform, so a ferrule having a desired distance between the two holes can be attained by controlling the original distance.

That is, in order to fabricate a ferrule having a lesser distance between the two holes, a new preform which is processed to have a decreased original distance between the two holes is used.

Therefore, if the distance between the two holes formed in a desired ferrule is different from a previous ferrule, the preform must be changed to a new one. The work to change the preform is complicated, however, and it results in economic and time losses.

Moreover, polishing the inner surface of the hole after fabricating the ferrule is generally undertaken to improve the illumination of the optical device using the ferrule. Due to the polishing work, the fabrication process of the ferrule becomes complicated and it takes a long time, and therefore fabrication costs become high.

SUMMARY OF THE INVENTION

It is therefore an objective of the present invention to fabricate dual hole ferrules having various distances between two holes, using a single preform.

It is another objective of the present invention to fabricate a preform for a dual hole glass ferrule by a simple process.

To meet the above and other objectives, the present invention provides a preform for a glass ferrule, comprising two holes that are formed through the preform and exit out to both side cross-sections of the preform, wherein the two holes are symmetrical to the center in a diameter direction of the preform and a distance between the two holes changes in a lengthwise direction of the preform.

The present invention provides a fabrication method of a dual hole glass ferrule using the preform as described above.

The two holes are inclined to a central axis in the lengthwise direction of the preform, and exist on the same plane as the central axis or are rotated around a point on the central axis.

The point on the central axis can be located inside or outside the preform, and the rotation angle is less than 180°.

The two holes are rotated around a point on the central axis, which is located inside the preform, and distances between the two holes on one side cross-section and other side cross-section of the preform are equal.

The present invention provides a fabrication method of a preform for a glass ferrule comprising the steps of preparing a sol of a glass composition; inserting two rods into a cylindrical mold such that they exit both side cross-sections of the mold through the mold, in which the rods are symmetrical to the center in a diameter direction of the mold and a distance between the two rods changes in a lengthwise direction of the mold; casting the sol into the mold to make the sol into a gel; and removing the rods and the mold to produce a preform in which two holes are formed after drying and heating the preform.

The two inserted rods are inclined to a central axis in the lengthwise direction of the mold, and exist on the same plane as the central axis or are rotated around a point on the central axis.

The point on the central axis is located inside or outside of the mold, and a rotation angle is less than 180°.

The two rods are rotated around a point on the central axis, which is located inside of the mold, and distances between the two rods on one side cross-section and another side cross-section of the mold are equal.

DETAILED DESCRIPTION OF THE PREFERRED EMBODIMENTS

A detailed description of a preform for a glass ferrule and a fabrication method thereof in reference to the attached figures is as follows.

FIGS. 3 to 6 show a preform for a glass ferrule according to the present Invention. As shown in FIGS. 3 to 6, the preform is processed from cylindrical glass.

As a glass composition for the preform, a general glass composition comprising high purity silica, pyrex, and vycor can be used. However, the glass composition of the preform is not constricted by a certain composition.

The diameter of the cylindrical glass can be generally 1-10 cm, but it is not constricted by this value. The diameter and length of the cylindrical glass are those that make it possible to put it into a drawing machine.

Two holes are formed longitudinally through the preform, exiting on each end thereof. The two holes are symmetrical with each other with respect to the center in a diameter direction of the preform, and a distance between the two holes changes along a lengthwise direction of the preform.

Figure 1:
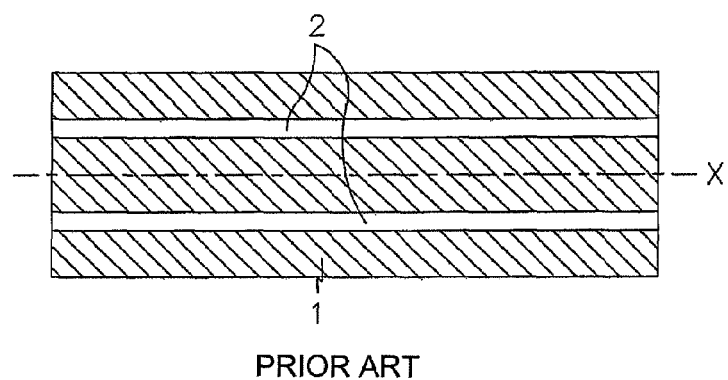
FIG. 1 is a longitudinal cross-sectional view showing a conventional preform for a glass ferrule.
Figure 2:
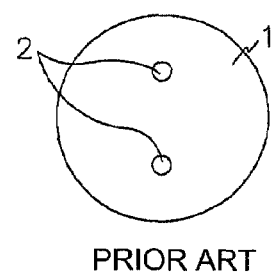
FIG. 2 is a horizontal cross-sectional view showing a conventional preform for a glass ferrule.
Figure 3:
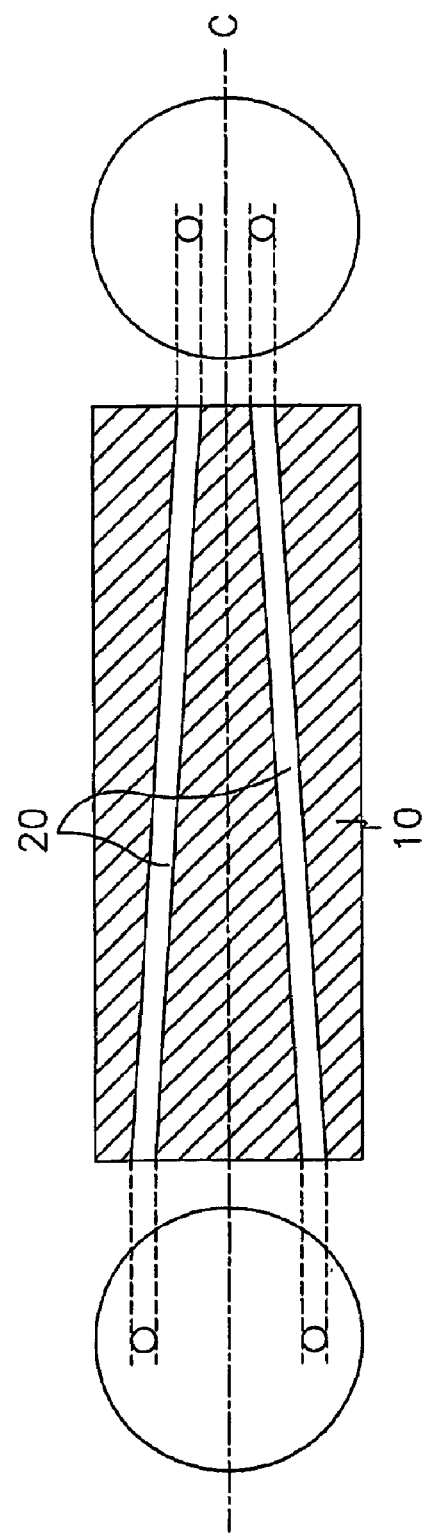
FIG. 3 is a cross-sectional view showing a preform for a glass ferrule according to a preferred embodiment of the present invention.

As shown in FIG. 3, the two holes 20 can be Inclined toward a central axis C in the length direction of the preform 10, and they can exist on the same plane as the central axis C.

Figure 4:
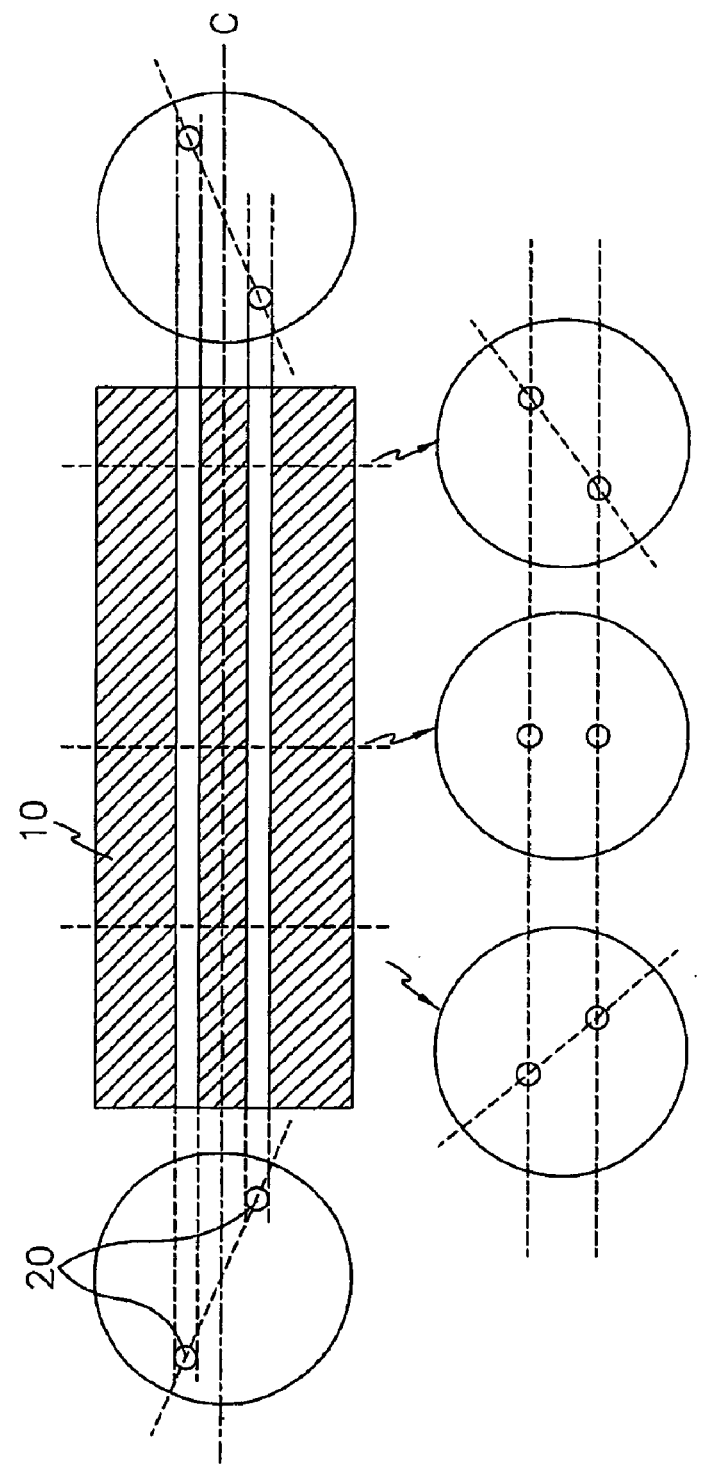
FIG. 4 is a cross-sectional view showing a preform for a glass ferrule according to another preferred embodiment of the present invention.
Figure 5:
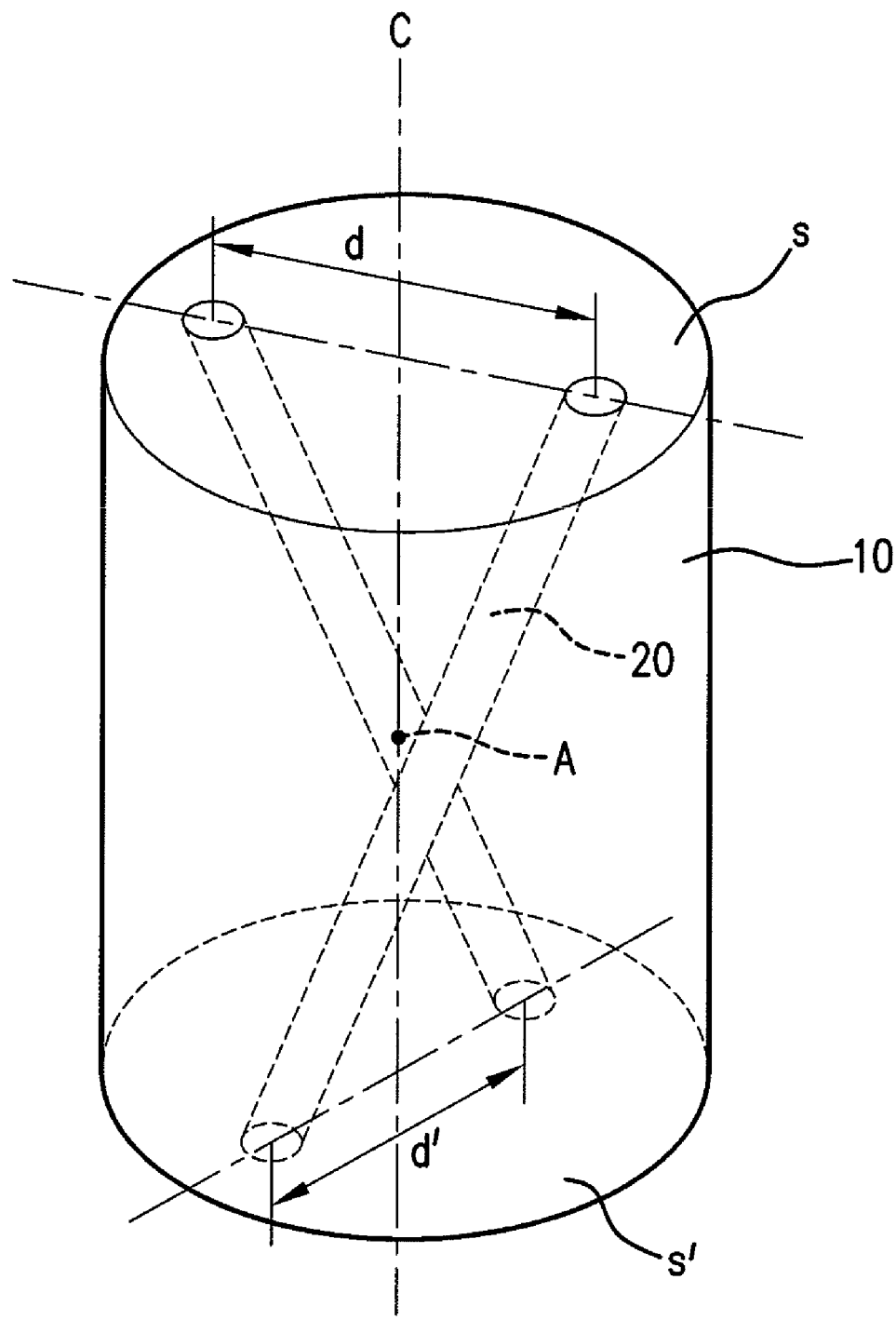
FIG. 5 is a perspective view showing the preform for a glass ferrule as shown in FIG. 4.
Figure 6:
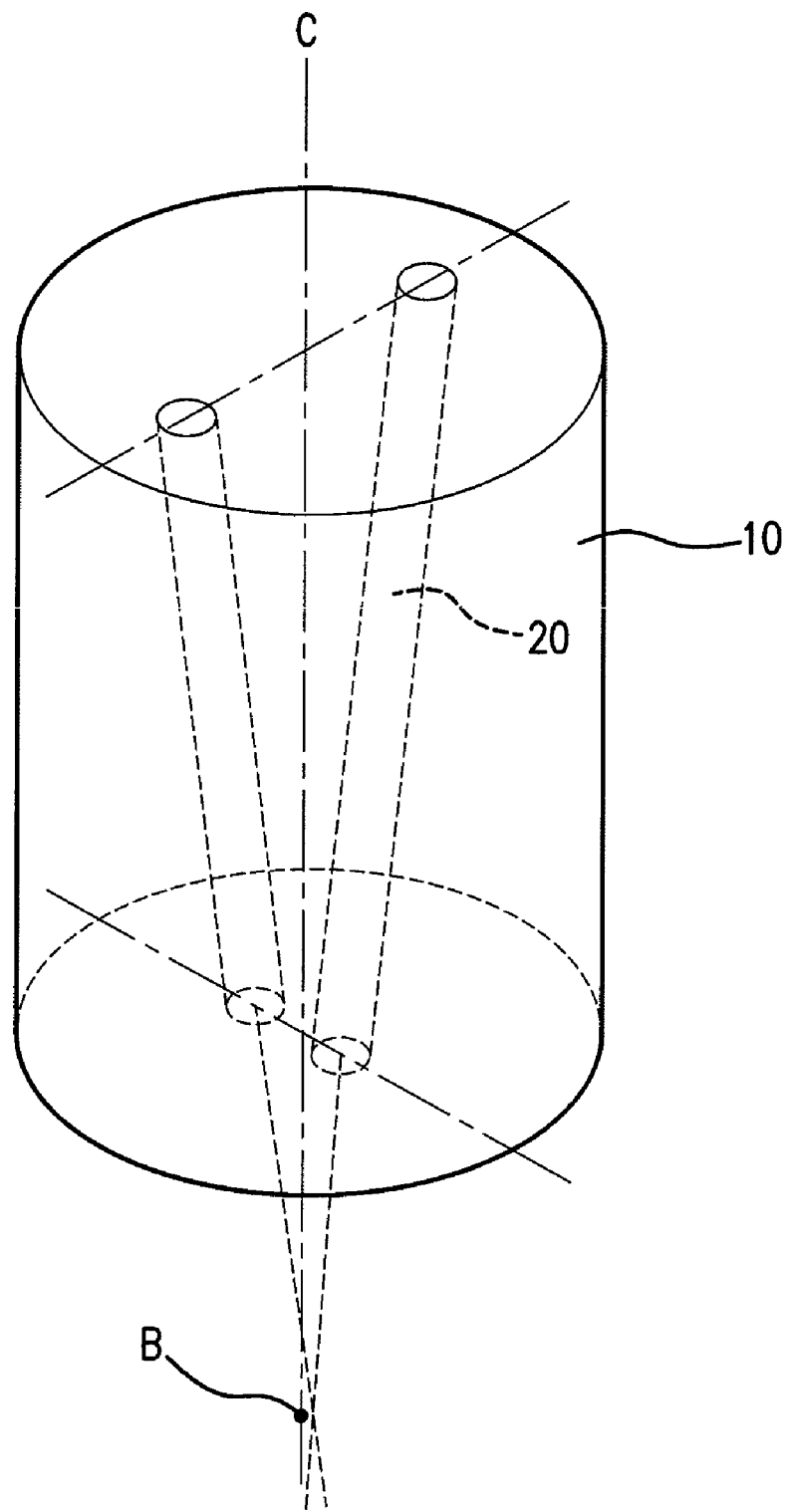
FIG. 6 is a perspective view showing the preform for a glass ferrule according to another preferred embodiment of the present invention.

Otherwise, as shown in FIGS. 4 to 6, the two holes 20 can be rotated around a point on the central axis C, and therefore they do not exist on the same plane as the central axis C, but they are still generally inclined in the direction of the central axis C.

In the case of rotation, the two holes 20 can be rotated around a point A being located Inside the preform 10 as shown in FIGS. 4 and 5, or they can be rotated around a point B being located outside the preform 10 as shown in FIG. 6.

The rotation angle is preferably less than 180°, since the two holes intersect each other at the rotation angle of 180°.

Particularly, when the point A being located Inside the preform 10 is a center point of the preform 10, the distance d between the two holes on one side cross-section s of the preform 10 and the distance d' between the two holes on the other side cross-section s' of the preform 10 are equal. This results from the rotation of the two holes along the central axis around the center point of the preform.

After putting the preform in which the two holes are formed as described above into a drawing machine, and drawing and cutting the preform to a predetermined length, a dual hole ferrule is obtained. This means that dual hole ferrules having differing distances between the two holes can be produced using a single preform.

Since the distance between the two holes changes in the lengthwise direction of the preform, a dual hole ferrule having a relatively wide hole spacing can be obtained from the portion of the preform where the distance between the two holes is relatively long.

On the contrary, a dual hole ferrule having a relatively short hole spacing can be obtained from the portion of the preform where the distance between the two holes is relatively short.

Since the ferrule is obtained after drawing in a drawing machine, the two holes in the ferrule are almost parallel to each other. Although the two holes are not perfectly parallel, there is no problem in using the ferrule because the degree of unparallelism is less than the maximum permissible unparallelism.

The two holes in the ferrule maintain their symmetry with respect to the center in the diameter direction of the ferrule, and they take part in guiding light.

Next, a fabrication method of the preform for glass ferrule according to the present invention is explained.

Figure 7:
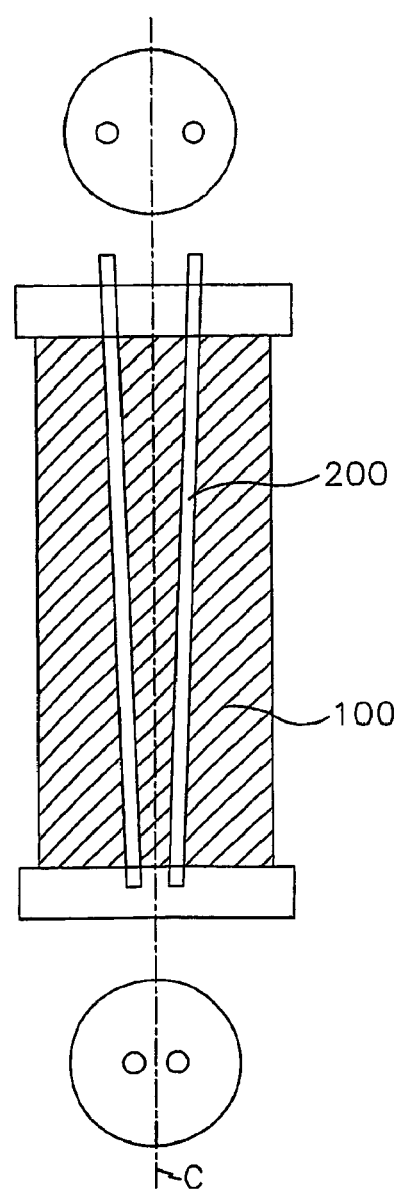
FIG. 7 is a cross-sectional view showing a fabrication method of the preform for a glass ferrule as shown in FIG. 3.

FIG. 7 is a cross-sectional view showing a fabrication method of the preform for a glass ferrule according to the present invention.

First, a sol of a glass composition is prepared. As the glass composition of the preform, a general glass composition comprising high purity silica, pyrex, and vycor can be used. However, the glass composition of the preform is not constricted by a certain composition.

Next, two rods 200 are inserted into a mold 100 with a cylindrically shaped internal space. The diameter of the mold 100 and the rod 200 are respectively determined by consideration of a desired diameter of the preform and the hole in the preform.

The two rods 200, which will make two holes, are formed through the mold 100, and exit the ends thereof. The two rods 200 are symmetrical to the center in the diameter direction of the mold 100, and the distance between the two rods 200 changes along the lengthwise direction of the mold 100.

The size of the mold, which determines the size of the preform, can be approximately 1-10 cm in diameter, but it is not constricted by this value. The diameter and length of the preform are those that make it possible to put it into a drawing machine.

As shown in FIG. 3, the two rods can be inclined to a central axis C in the lengthwise direction of the mold, and they exist on the same plane as the central axis C.

Otherwise, as shown in FIGS. 4 to 6, the two rods can be rotated around a point on the central axis C, and therefore they do not exist on the same plane as the central axis C, but they are still inclined in the direction of the central axis C.

The degree of unparallelism of the two rods inserted into the mold can be controlled by the diameter and height of the mold, and the diameter and length of the ferrule.

For example, in order to make the two holes more parallel in the ferrule, the inclination of the two rods in the mold must be decreased. On the contrary, if the degree of unparallelism of the two holes is less than the maximum permissible unparallelism, the inclination of the two rods in the mold can be Increased to fabricate dual hole ferrules having various distances In a wider range between the two holes, using a single preform.

The rotation angle can be controlled to a desired distance between the two holes considering the fact that the distance between the two rods becomes larger if the rotation angle becomes larger.

Next, the sol is cast into the internal space of the mold, excepting the internal space of the two rods, to make the sol into a gel.

Next, the preform is heated and dried, and the rods and mold are removed to produce a preform in which two holes are formed, completing the fabrication of the preform according to the present invention.

By putting the preform in which the two holes are formed as described above into a drawing machine, drawing and cutting the preform to a predetermined length while maintaining an appropriate temperature and drawing speed, a dual hole ferrule is obtained.

A dual hole ferrule having a relatively wide hole spacing can be obtained from the portion of the preform where the distance between the two holes is relatively wide.

On the contrary, a dual hole ferrule having a relatively short hole spacing can be obtained from the portion of the preform where the distance between the two holes is relatively short.

Therefore, dual hole ferrules having various distances between two holes can be produced by using a single preform.

A preferred embodiment of the present invention is explained as follows.

Embodiment 1

First, silica sol comprising fine powder was prepared, and two rods having a diameter of 3.52 mm were inserted into a mold having a diameter of 50 mm and height of 300 mm.

The two rods in one side cross-section of the mold were positioned such that the distance from the center of one side cross-section of the mold to the center of each of the two rods was 10 mm, and the total distance between the two rods in the one side cross-section of the mold was 20 mm.

Next, the two rods in the other side cross-section of the mold were positioned such that the centers of the rods were made to exist on one plane comprising the central axis in the lengthwise direction of the mold, and then the distance from the center of the same side cross-section of the mold to the center of the two rods respectively was made to be 2.5 mm, and the total distance between the two rods in the same side cross-section of the mold was made to be 5 mm Next, the prepared silica sol was cast into the internal space of the mold, excepting the internal space of the two rods, to make the sol into the gel.

Next, after drying and heating the glass preform, the mold and rods were removed to produce a preform in which two holes were formed.

Next, the glass preform was drawn to a ferrule having a diameter of 1.80 mm and cut to a ferrule having a length of 7 mm. The distance between the two holes in the ferrule was in the range of 720 µm to 180 µm.

The degree of unparallelism of the two holes in the ferrule was less than 1 µm, which was the maximum permissible unparallelism.

Embodiment 2

A ferrule according to the embodiment 2 of the present invention was fabricated by the same method as the embodiment 1, except for the distance between the two rods in the mold.

The distances between the two rods on both side cross-sections of the mold were respectively 15 mm and 5 mm, and the distance between the two holes in the ferrule was in the range of 540 µm to 180 µm. The degree of unparallelism of the two holes in the ferrule was less than 1 µm, which was the maximum permissible unparallelism.

Specifically, the degree of unparallelism of the two holes in the ferrule was 0.2-0.3 µm.

Embodiment 3

A ferrule according to the embodiment 3 of the present invention was fabricated by the same method as the embodiment 1, except for the position of the rods in the mold.

The distances between the two rods on both side cross-sections of the mold were each 20 mm, and the two rods were rotated by 90° around a point on the central axis in the lengthwise direction of the mold while maintaining symmetry with the central point.

The glass preform was drawn to a ferrule having a diameter of 1.80 mm and cut to a ferrule having a length of 7 mm. The distance between the two holes in the ferrule was in the range of 720 µm to 509 µm. The degree of unparallelism of the two holes in the ferrule was less than 1 µm, which was the maximum permissible unparallelism.

Embodiment 4

A ferrule according to the embodiment 4 of the present invention was fabricated by the same method as the embodiment 1, except for the position of the rods in the mold.

The distances between the two rods on both side cross-sections of the mold were each 20 mm, and the two rods were rotated by 120° around a point on the central axis in the lengthwise direction of the mold while maintaining symmetry with the central point.

The distances between the two rods on both side cross-sections of the mold were respectively 20 mm and 10 mm, and the distance between the two holes in the ferrule was in range of 720 µm to 360 µm. The degree of unparallelism of the two holes in the ferrule was less than 1 µm, which was the maximum permissible unparallelism.

When the rotation angle is greater than 120°, the distance between the two holes in the ferrule can be decreased.

As described above, since the distance between the two holes in the preform according to the present invention changes in the lengthwise direction of the preform, it is possible to fabricate dual hole ferrules having various distances between the two holes, using a single preform.

Therefore, dual hole ferrules having various distances between the two holes are fabricated by one process, and the fabrication cost is decreased due to the savings of time and cost in changing the preform for fabricating the ferrules.

In addition, the fabrication method according to the present invention is simple in comparison to the conventional process in which the holes are directly formed in the glass preform.

What is claimed is:

1. A fabrication method of a glass ferrule comprising the steps of:

preparing a sol of a glass composition;

inserting two rods into a cylindrical mold having a central two side cross-sections, such that the two rods exit both side cross-sections of the mold through the mold, in which the rods are symmetrical on any cross-section perpendicular to the central axis of the mold with respect to the center of the cross section, and the distance between the two rods on such cross-section changes in a lengthwise direction of the mold;

casting the sol into the mold to make the sol into a gel;

drying and heating the gel; and removing the rods and the mold to produce a preform with two holes;

drawing said preform into the lengthwise direction; and cutting said preform into dual hole ferrules.

2. The fabrication method of a preform for a glass ferrule of claim 1, in which the two rods are inclined with respect to a central axis in the lengthwise direction of the mold and they exist on the same plane as the central axis.

3. The fabrication method of a preform for a glass ferrule of claim 1, in which the two rods do not lie within any common plane.

4. The fabrication method of a preform for a glass ferrule of claim 3, wherein the distances between the two rods on the two side cross-sections of the mold are equal.

5. A fabrication method of a dual hole glass ferrule comprising the steps of:
preparing a sol of a glass composition;
inserting two rods into a cylindrical mold having a central axis and two side cross-sections, such that the two rods exit both side cross-sections of the mold through the mold, and a distance between the two rods changes in a lengthwise direction of the mold;
casting the sol into the mold to make the sol into a gel;
drying the gel;
heating the gel;
removing the rods and the mold to produce a preform;
drawing the preform with a drawing machine, and
cutting the preform to produce a ferrule.

6. The fabrication method of a dual hole glass ferrule of claim 5, in which the two rods lie on a common plane comprising the central axis of the mold.

7. The fabrication method of a dual hole glass ferrule of claim 5, in which the two rods do not lie within any common plane.

8. The fabrication method of a dual hole glass ferrule of claim 7, wherein the distances between the two rods on the two side cross-sections of the mold are equal.

* * * * *